(12) United States Patent
Fairless et al.

(10) Patent No.: US 6,533,061 B1
(45) Date of Patent: *Mar. 18, 2003

(54) BOLT-TOGETHER HITCH FOR ARTICULATED MACHINE

(75) Inventors: Terence Fairless, Durham (GB); Anthony J. Pollock, Stockton-on-Tees (GB)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/941,843

(22) Filed: Oct. 1, 1997

(51) Int. Cl.[7] ................... B60D 12/24; B62B 13/18; B62D 13/00
(52) U.S. Cl. ................... 180/418; 180/419; 180/420; 180/9.4; 280/400; 280/494
(58) Field of Search ................... 180/418, 419, 180/420, 9.4, 9.42, 9.44, 9.46; 280/400, 494, 504; 403/337

(56) References Cited

U.S. PATENT DOCUMENTS

| | | |
|---|---|---|
| 1,204,190 A | 11/1916 | Rhodes |
| 1,609,288 A | 12/1926 | Bloss |
| 1,631,236 A | 6/1927 | Werner |
| 1,756,336 A | 4/1930 | Bijur |
| 1,887,755 A | 11/1932 | Gerold |
| 3,253,671 A | 5/1966 | Fielding |
| 3,630,302 A | 12/1971 | Holland |
| 3,773,129 A | 11/1973 | Anderson |
| 4,758,109 A | * 7/1988 | Little et al. .................. 403/337 |
| 4,966,242 A | * 10/1990 | Baillargeon .................. 280/400 |
| 5,180,028 A | * 1/1993 | Perrenoud .................... 280/494 |
| 5,725,063 A | 3/1998 | Ceragioli et al. |

FOREIGN PATENT DOCUMENTS

GB  1 427 194  3/1976

OTHER PUBLICATIONS

SFSA: Article about casting or forgings a realistic evaluation.*
Avallone, Eugene A. et al. "Base Metals for Welding," *Mark's Standard Handbook for Mechanical Engineers*, 1996, pp. 13–43 –13–44, 1996.*
Stout, Robert D. et al. *Weldability of Steels*, 1953, pp. 84–90, 191–215, 1953.*
Norton, Machine Design—An Integrated Approach, Prentice–Hall, Upper Saddle River, New Jersey, pp. 526–527, 1998.*
Caterpillar Service Publication—D300E "Articulated Truck" Publication No. AEHQ5112–01 12–96.

* cited by examiner

*Primary Examiner*—Brian L. Johnson
*Assistant Examiner*—Hau Phan
(74) *Attorney, Agent, or Firm*—Joseph W Keen; Finnegan

(57) ABSTRACT

A bolt-together hitch for a machine having articulatable first and second sections, including a generally annular yoke member of cast steel having a cylindrical portion which is trunnion mounted by bearings in a longitudinal bore formed by the first section and a tube member of forged steel bolted end to end to the yoke member, the yoke member integrally forming brackets to provide an articulated pivot joint with the second section.

12 Claims, 4 Drawing Sheets

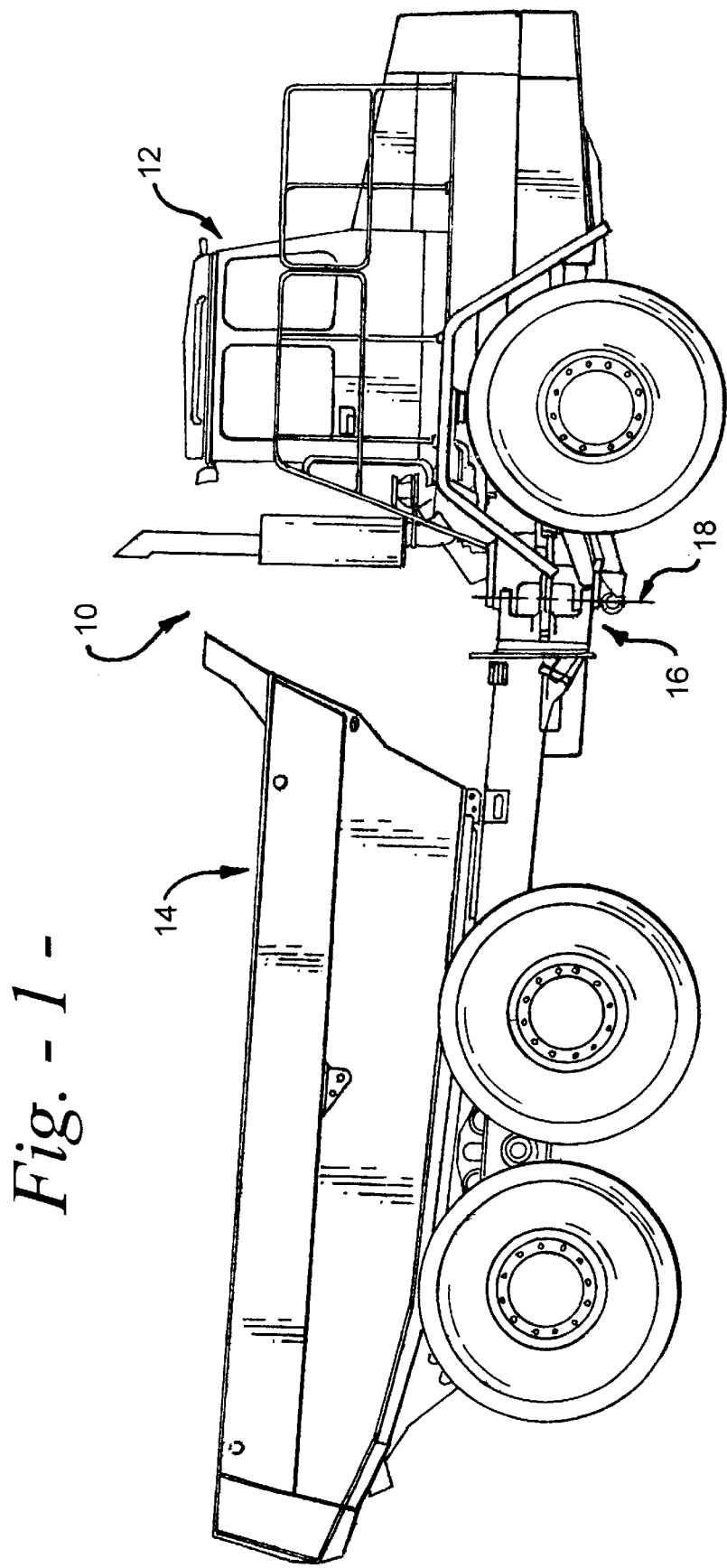
Fig. -1-

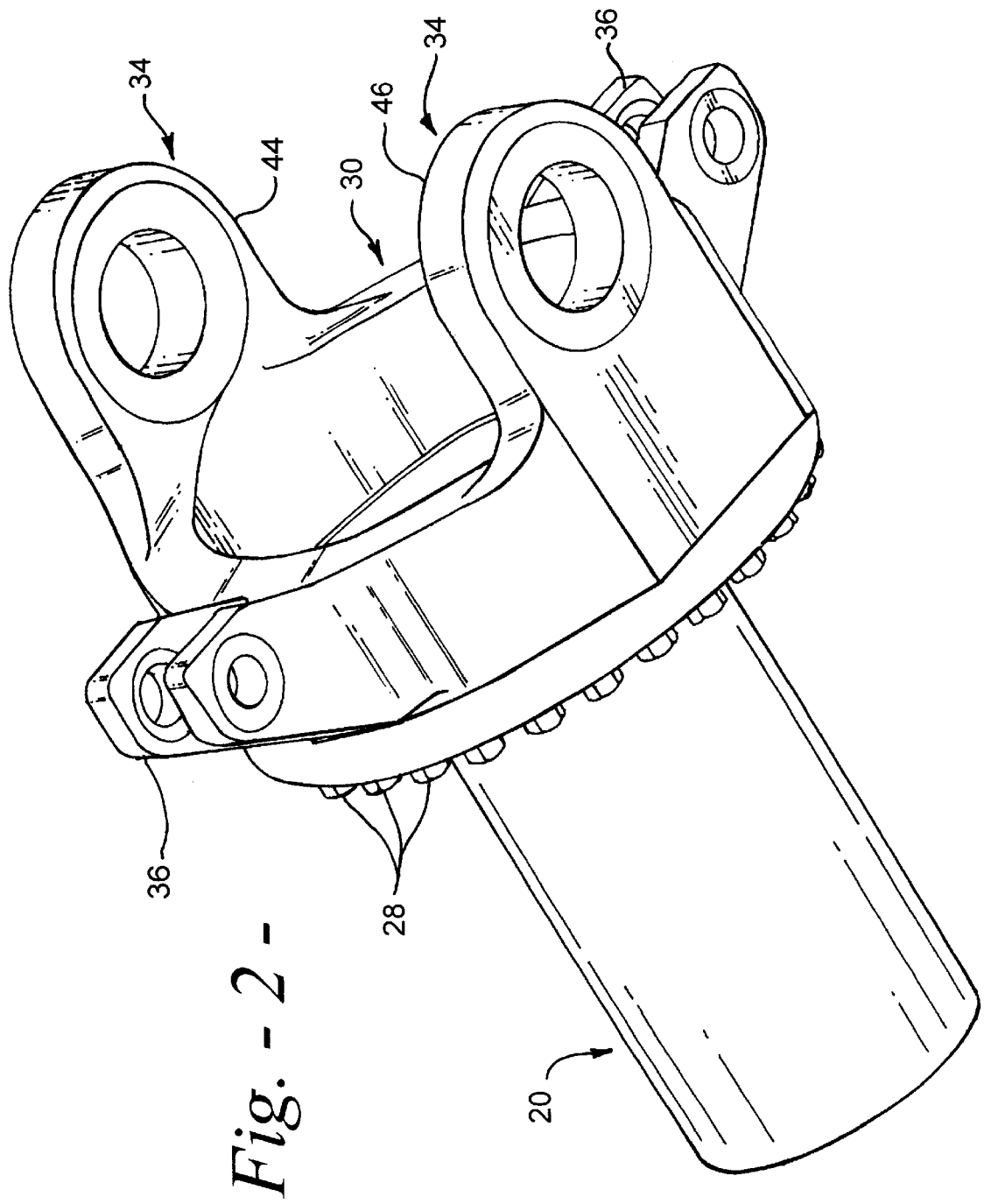
Fig. -2-

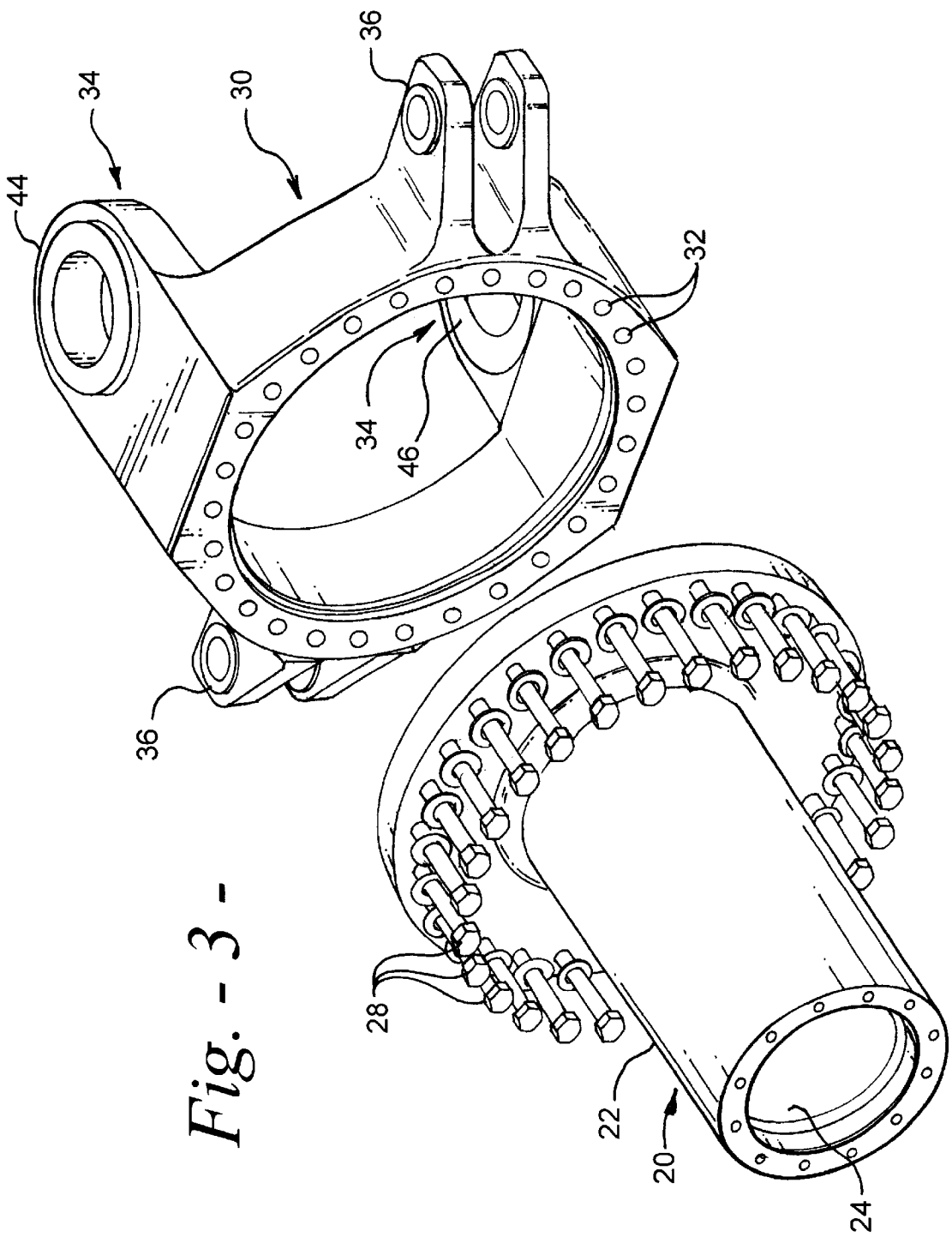
Fig. - 3 -

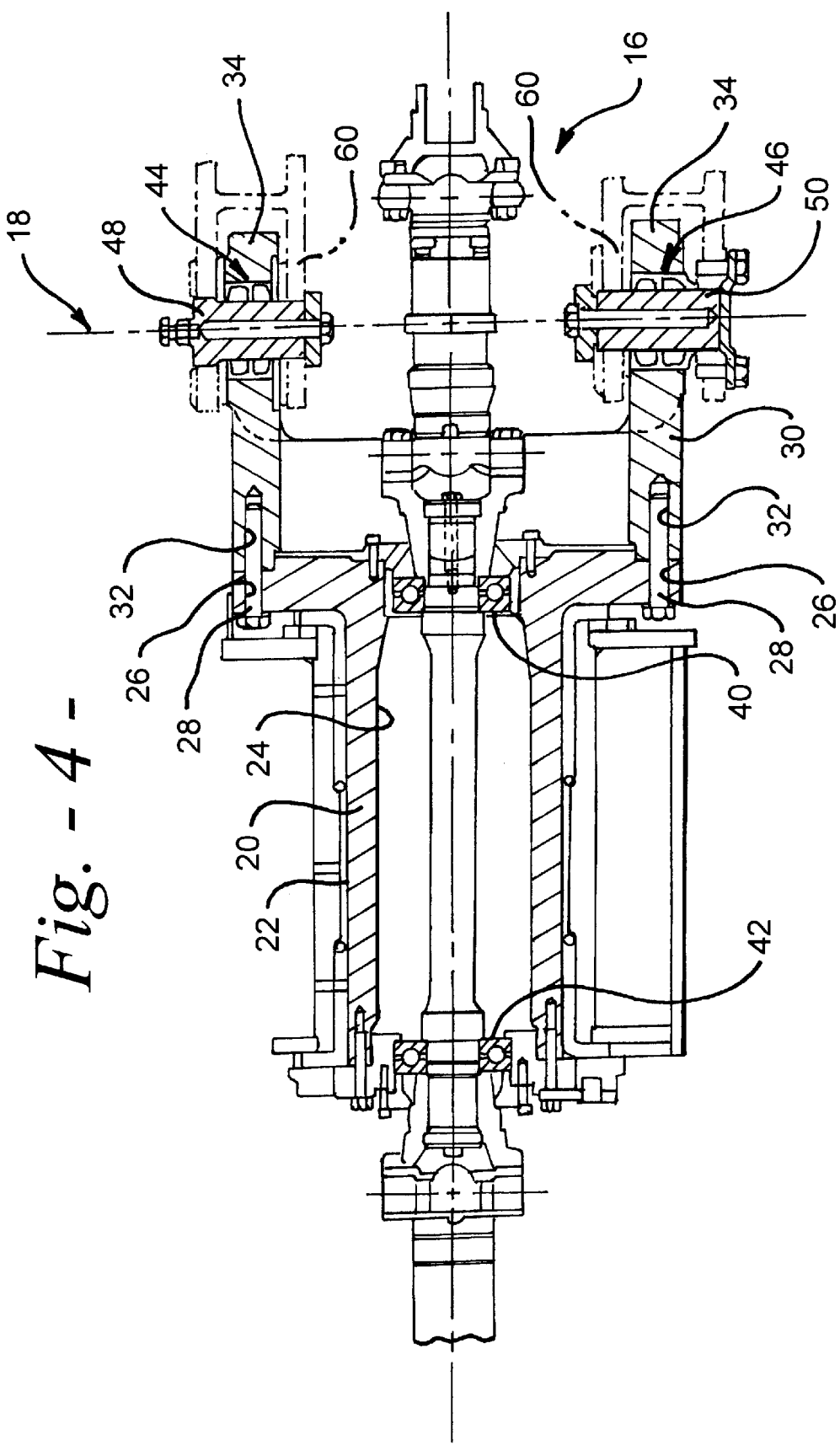
Fig. - 4 -

BOLT-TOGETHER HITCH FOR ARTICULATED MACHINE

TECHNICAL FIELD

This invention relates generally to a coupling assembly for articulated machines and more particularly to such a coupling assembly which is bolted together.

BACKGROUND ART

It is well known in the prior art to provide coupling means, or a hitch, between two sections of a machine to permit articulated movement about a generally vertical pivot axis. However, such prior art hitches are typically of integral construction and are, thus, formed from only one material which may not best meet the material requirements of all portions of the hitches. For example, the portion of an articulating hitch which houses drive shaft bearings may experience significantly more wear that the portion which houses articulation bearings. In U.S. Pat. No. 3,773,129 issued to Anderson on Nov. 20, 1973, a compact unitary coupling is described for facilitating interconnection with two machine sections. There, the unitary nature of the coupling necessitates a single material of construction, which material may not best meet the requirements of hardness, durability or strength of a particular hitch portion.

Where different materials of construction are used in different hitch portions, the portions may not be separated for repair or replacement of an individual portion. For example, in the Caterpillar D300E Articulated Truck the hitch is formed of two portions, each of a different material, which are robotically welded together. While providing outstanding strength, an individual portion of a unitary welded hitch is not repairable or replaceable.

The present invention is directed to overcoming one or more of the problems set forth above.

DISCLOSURE OF THE INVENTION

In one aspect of the present invention, a hitch assembly for an articulated machine having front and rear sections permits articulation of the machine sections about a vertical axis. The hitch assembly includes a tube member having opposing ends, inner and outer surfaces which are wear-resistant and hardened, a plurality of fastener holes at one of the ends, a yoke member having opposing ends with one of the ends having a plurality of fastener-receiving holes which are axially alignable with the fastener holes of the tube member, and a plurality of fasteners receivable in the axially alignable holes for fastening the tube and yoke members together. The yoke member also has a pair of spaced apart receptacles for receiving pivoting means for pivoting the hitch assembly about the vertical axis, and a boss for receiving pivot actuating means. The yoke member is removably fastenable to the tube member.

In another aspect of the present invention, a hitch assembly for an articulated machine having front and rear sections permits articulation of the machine sections about a vertical axis. The hitch includes a tube member having opposing ends and inner and outer surfaces and a yoke member having opposing ends, the yoke member being removably fastenable to the tube member, and having a pair of spaced apart receptacles for receiving pivoting means for pivoting the hitch assembly about the vertical axis.

BRIEF DESCRIPTION OF THE DRAWINGS

FIG. 1 is a side view in elevation of an articulated machine including two sections joined together by a hitch embodying the present invention.

FIG. 2 is a perspective view of the present invention showing upper and lower spaced-apart pivot receptacles and a pair of laterally-opposed bosses for receiving pivot actuating means.

FIG. 3 is a perspective view of the invention described in FIG. 2 with the tube and yoke members separated.

FIG. 4 is a diagrammatic side view of the present invention in cross section installed in an articulating machine.

BEST MODE FOR CARRYING OUT THE INVENTION

Referring to the drawings, FIG. 1 shows an articulated machine 10 having a front section 12 and a rear section 14. The respective sections 12,14 are linked at articulating hitch 16 for pivoting about vertical axis 18. Referring now to FIGS. 2–4, articulating hitch 16 includes a cylindrical tube member 20 and cylindrical yoke member 30. Tube member 20 has outer and inner surfaces 22,24, opposing ends and a plurality of fastener holes 26, such as bolt holes, arranged in a circular pattern on one end. Yoke member 30 likewise has opposing ends and a plurality of fastener-receiving holes 32, such as bolt-receiving holes, on one end. Fastener holes 26 and fastener-receiving holes 32 are axially alignable with each other. When the tube and yoke members 20,30 are assembled as shown in FIG. 2, fasteners 28, such as bolts, pass through the fastener holes 26 into the fastener-receiving holes 32 and securely fasten the tube and yoke members 20,30 together end to end.

Referring now to FIGS. 3–4, the surfaces 22,24 of tube member 20 are preferably made of a wear-resistant and hardened material, such as forged steel, to facilitate remanufacture thereof. The inner surface 24 of tube member 20 is advantageously adapted for use with bearings 40,42 as are commonly used to support the drive shaft of an articulated machine.

The yoke member 30 has a trunnion 34 defined about vertical axis 18. As best shown in FIG. 4, trunnion 34 includes a first pivot receptacle 44 and a second pivot receptacle 46, which respectively receive a first bearing 48 and a second bearing 50 for linking yoke member 30 to a bifurcated bracket 60 at the front section 12 of articulated machine 10. Bifurcated bracket 60 defines a longitudinal bore (not shown) on front section 12 that is coaxially aligned with vertical axis 18. As shown in FIG. 2, yoke member 30 additionally has a pair of articulation cylinder bosses 36 on opposing lateral sides of yoke member 30, each for receiving a steering cylinder (not shown). Yoke member 30 is advantageously made of cast steel.

INDUSTRIAL APPLICABILITY

In operation, tube member 20 experiences significantly more wear than yoke member 30. In the bolt-together hitch 16, because the tube member 20 is easily separated from the yoke member 30, a new or remanufactured tube member may replace a worn or damaged tube member without discarding the yoke member. Also, the tube member may be replaced while the yoke member remains on the machine 10. These features offer significant cost and time savings.

Other aspects, objects and advantages of this invention can be obtained from a study of the drawings, the disclosure, and the appended claims.

What is claimed is:

1. A hitch assembly for an articulated machine, the machine having front and rear sections, the hitch permitting articulation of the machine sections about a vertical axis, comprising:

a tube member comprising forged steel and having opposing ends and an outer surface, the surface being wear-resistant and hardened, the tube member having a plurality of bolt holes at one of the ends and being pivotally supported at the other end by one of the sections;

a yoke member comprising cast steel and having opposing ends, one of the ends having a plurality of bolt-receiving holes which are axially alignable with the bolt holes of the tube member, and the other of the ends having a pair of spaced apart receptacles for receiving pivoting means for pivoting the hitch assembly about the vertical axis, the yoke member further including a boss for receiving pivot actuating means, the yoke member being removably fastenable to the tube member; and a plurality of fasteners receivable in the axially alignable holes for fastening the tube and yoke members together such that when said fasteners are removed from the bolt-receiving holes, said tube member is axially movable in a direction from the tube member's one end toward the tube member's other end.

2. The hitch assembly as set forth in claim 1 wherein the tube member further comprises an inner surface adapted for use with a bearing for rotatable supporting a drive shaft extending between the sections.

3. A hitch assembly for an articulated machine, the machine having front and rear sections, the hitch permitting articulation of the machine sections about a vertical axis, comprising:

a tube member having opposing one and an other ends with a flange being disposed at said one end and an outer surface wherein said surface comprises wear-resistant, relatively, hard material; and a yoke member having opposing ends, a passageway extending between said opposing ends, and a pair of spaced apart receptacles for receiving pivoting means for pivoting the hitch assembly about the vertical axis, said yoke member comprising material of relatively high strength and being removably fastenable at one end to the tube member, wherein (i) said yoke member's one end, during fastening of said tube member thereto, is abutted by said tube member's flange when said tube member moves in a direction from its other end toward its one end and (ii) said tube member does not extend into said passageway of said yoke member when said one end of said yoke member is removably fastened to said tube member.

4. The hitch assembly as set forth in claim 3 further comprising a boss on the yoke member for receiving pivot actuating means.

5. A hitch assembly for a machine having front and rear sections each with ground engaging members driven by a drive shaft wherein the hitch permits articulation of the sections about a vertical axis, said hitch comprising:

a tube member having one and an other end, inner and outer surfaces, and a flange at one of the ends having a plurality of bolt holes, the surfaces being relatively wear resistant and hardened wherein the inner surface provides rotatable support for the drive shaft and the outer surface is rotatably supported at the other end by one of the front and rear sections; and a yoke member fixed to the other one of the front and rear sections having one and an other end wherein said one end has a plurality of bolt holes, said one ends of the tube member and the yoke member being axially abuttable such that said bolt holes of said tube member are axially alignable with said bolt holes of said yoke member for reception of bolts in said aligned holes to fixedly join said members, wherein the members, when in the axially abuttable but not fixedly joined relationship, permit each member to be moved in a direction from its one end toward its other end.

6. A hitch assembly for an articulated machine, the machine having front and rear sections, the hitch permitting articulation of the machine sections about a vertical axis, comprising:

a tube member comprising forged steel and having opposing ends and an outer surface, the surface being wear-resistant and hardened, the tube member having a plurality of fastener holes at one of the ends and being pivotally supported at the other end by one of the sections;

a yoke member comprising cast steel and having opposing ends, one of the ends having a plurality of fastener-receiving holes which are axially alignable with the fastener holes of the tube member, and the other of the ends having a pair of spaced apart receptacles for receiving pivoting members that are configured to pivot the hitch assembly about the vertical axis, the yoke member further including a boss for receiving a pivot actuator, the yoke member being removably fastenable to the tube member; and a plurality of fasteners receivable in the axially alignable holes for fastening the tube and yoke members together such that when the fasteners are removed from the fastener-receiving holes, the tube member is axially movable in a direction from the tube member's one end toward the tube member's other end.

7. The hitch assembly as set forth in claim 6, wherein the inner surface of the tube member is adapted for use with a bearing.

8. The hitch assembly as set forth in claim 6, wherein the pivot actuator is a steering cylinder.

9. The hitch assembly as set forth in claim 6, wherein the pivoting members are bearings.

10. A hitch assembly for an articulated machine, the machine having front and rear sections, the hitch permitting articulation of the machine sections about a vertical axis, comprising:

a tube member having opposing first and second ends with a flange being disposed at the first end, the tube member having an outer surface of a wear-resistant, relatively hard material; and a yoke member having opposing first and second ends, a passageway extending between the first and second ends, and a pair of spaced apart receptacles for receiving pivoting members configured to pivot the hitch assembly about the vertical axis, the yoke member including a boss configured to receive a pivot actuator, being formed of a material of relatively high strength and being removably fastenable at the first end to the tube member, wherein
  (i) the first end of the yoke member, during fastening of the tube member thereto, is abutted by the flange of the tube member when the tube member is moved in a direction from its second end toward its first end, and
  (ii) the tube member does not extend into the passageway of the yoke member when the first end of the yoke member is removably fastened to the tube member.

11. The hitch assembly as set forth in claim 10, wherein the pivot actuator is a steering cylinder.

12. The hitch assembly as set forth in claim 10, wherein the pivoting members are bearings.

* * * * *